Jan. 17, 1950    R. R. L. GEFFROY    2,494,653
CHECK VALVE
Filed Aug. 7, 1945
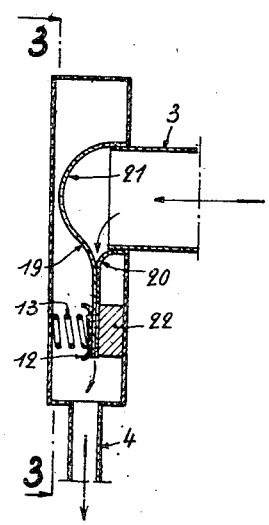
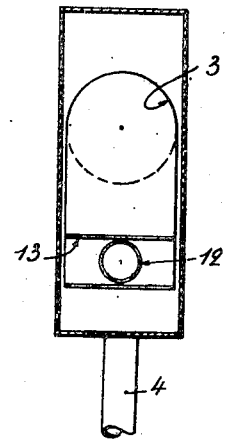
ROBERT RENÉ LOUIS GEFFROY
INVENTOR
his ATT'Y.

Patented Jan. 17, 1950

2,494,653

UNITED STATES PATENT OFFICE 2,494,653

CHECK VALVE

Robert René Louis Geffroy, Neuilly-sur-Seine, France, assignor to Volcan S. A., Levallois (Seine), France Application August 7, 1945, Serial No. 609,371

In France March 24, 1945

1 Claim. (Cl. 251—122)

The present invention is concerned with a check valve, adapted to be inserted in a conduit through which a fluid is circulated, for preventing the fluid from flowing backward with respect to the normal direction of flow. More particularly, such valves may be inserted in oxygen and acetylene conduits for feeding oxyacetylenic torches, in order to avoid formation of an explosive mixture in the conduit for each one of the two gases, by the backward flow either of oxygen into the acetylene conduit or of acetylene into the oxygen conduit.

Check valves at present used on low pressure gas pipings (for example, acetylene pipings) are generally of the hydraulic type. They efficiently prevent the flow of gas in the direction contrary to the normal, provided that the hydraulic joint established therein is correct. However, they have several drawbacks:

(a) If a back flow is started past the hydraulic valve, the gases which, in the absence of the valve, would flow back, will be discharged into the atmosphere.

(b) When the hydraulic head of the valve is reduced, the valve is inefficient and dangerous.

(c) Such valves are liable to freeze in winter.

(d) Their use is limited to low operative pressures, corresponding to their hydraulic head (with water, to 100 g. per sq. cm. of pressure in the gas conduit corresponds to a hydraulic head of 1 meter).

(e) Valves of this kind cause a pressure drop equal to the depth of liquid through which the gas must flow in normal operation.

When the pressure of the gas flowing through the piping exceeds the maximum pressure permitting the use of hydraulic valves, or in the case of a liquid, use is made of ordinary flap valves, which in turn have the following drawbacks:

(a) When the flap is not strongly applied against its seat by a spring or by its weight, as in the case of "dry valves" (in contradistinction to hydraulic valves) as used for example in welding plants, their efficiency in the case of small counter-pressure is generally poor, because whatever be the accuracy with which such valves and their seats are constructed, the slightest defect in manufacturing or the smallest foreign particle introduced into the conduits is liable to impair the necessary fluid-tightness;

(b) reversely, if the flap is made heavy or the spring tension high enough for ensuring fluid-tightness, the pressure drop becomes excessive.

The invention has for its object to devise a check valve adapted to avoid these various defects.

According to the invention, the obturating member of the valve forms a part of a flexible membrane of large operative surface, adapted to be yieldingly applied against its seat with such a force as to produce a comparatively strong pressure on the area of the seat and to produce a very small pressure on the whole membrane area. In this way, lifting of the membrane takes place under a slight excess of the upstream pressure, hence with a minimum pressure drop, while closure of the valve, when the upstream and downstream pressures are balanced, takes place with a force strong enough for assuring good fluid-tightness.

According to the embodiment of the invention described herein, the aforesaid membrane forms one of the lips of a rubber gas intake hose, the two lips being pressed against each other either by the inherent yielding properties of the hose, or by the action of an auxiliary force (gravity or a spring). In both cases, the area of the lips must be such that, with the fluid flowing in the normal direction, the force applying the two lips against each other may be balanced by a small pressure exerted upon a large surface, thereby reducing to a very small extent the difference between the upstream and downstream pressures.

The check valve according to the invention thus obviates the drawbacks of the valves known heretofore and ensures, by means of a very small operative pressure drop, absolute fluid-tightness against a backward flow of the fluid.

In the accompanying drawings, which show, by way of example, one embodiment of the invention:

Fig. 1 is a longitudinal sectional view, showing a check valve embodying a rubber gas intake hose and Fig. 2 is a sectional view along line 3—3 of Fig. 1.

The check valve shown in the drawing comprises a body provided with an inlet duct 3 and an outlet duct 4.

A rectangular plate 12 pressed by a spring 13, causes the two lips 19, 20 of a rubber hose 21 to be pressed against each other on a common backing support 22.

At rest, or when the upstream and downstream pressures are balanced, the pressure of spring 13, transmitted by plate 12, presses the two lips against each other, thereby ensuring an excellent fluid-tightness. The smallest upstream overpressure, acting upon a large surface of lip 19, moves the latter away from lip 20, thus allowing the fluid to flow in the normal direction, with the minimum pressure drop.

It will be understood that the invention is not limited to the particular embodiment described and shown, which have been given merely by way of example.

Having now described my invention, what I claim as new and desire to secure by Letters Patent is:

A check valve for use in low pressure gas pipings, comprising means defining a check valve chamber having upstream and downstream pipe connections, a flexible hose section extending from the upstream pipe connection into said chamber, means for resiliently urging one side of said hose section into engagement with the other at a point adjacent the end thereof and in substantially spaced relation to said upstream pipe connection, thereby forming a valve control of fluid flow through said hose section, said hose section intermediate its point of engagement with said resiliently urging means and said upstream pipe connection being subjected on its outside to the gas pressure prevailing on the downstream side of said valve and on its inside to the gas pressure prevailing on the upstream side of said valve, and said resiliently urging means being responsive to slight changes in the pressure difference between the gas present at the upstream and downstream sides of said valve to open and close said valve.

ROBERT RENÉ LOUIS GEFFROY.

REFERENCES CITED

The following references are of record in the file of this patent:

UNITED STATES PATENTS

| Number | Name | Date |
|---|---|---|
| 143,907 | Hyde | Oct. 21, 1873 |
| 2,006,319 | Hueber | June 25, 1935 |
| 2,015,915 | Adsit | Oct. 1, 1935 |
| 2,112,625 | Jackson | Mar. 29, 1938 |